United States Patent
Terrill et al.

(10) Patent No.: US 7,708,511 B2
(45) Date of Patent: May 4, 2010

(54) FASTENING ASSEMBLY

(75) Inventors: Andrew B. Terrill, Chippewa Falls, WI (US); Richard P. Gustafson, Chippewa Falls, WI (US); James S. Tisol, Jr., Chippewa Falls, WI (US); Brock T. Cooley, Bloomer, WI (US)

(73) Assignee: Illinois Tool Works Inc., Glenview, IL (US)

( * ) Notice: Subject to any disclaimer, the term of this patent is extended or adjusted under 35 U.S.C. 154(b) by 378 days.

(21) Appl. No.: 11/493,947

(22) Filed: Jul. 27, 2006

(65) Prior Publication Data
US 2008/0025818 A1    Jan. 31, 2008

(51) Int. Cl.
F16B 35/06 (2006.01)
B60P 7/08 (2006.01)

(52) U.S. Cl. .................. 411/400; 248/499; 410/101

(58) Field of Classification Search .............. 411/411, 411/401, 400; 24/265 AL; 16/444, 445; 248/499; 410/101, 112, 113; D8/30, 306, D8/356, 367
See application file for complete search history.

(56) References Cited

U.S. PATENT DOCUMENTS

| | | | | |
|---|---|---|---|---|
| 245,394 A | * | 8/1881 | Perkins ..................... 16/445 |
| 2,625,118 A | * | 1/1953 | Lechner ..................... 410/104 |
| 3,042,094 A | * | 7/1962 | Liljeberg ..................... 411/271 |
| 4,570,987 A | * | 2/1986 | Wong et al. ................... 294/1.1 |
| 4,589,163 A | * | 5/1986 | Weatherby et al. ............. 16/443 |
| 4,641,986 A | * | 2/1987 | Tsui et al. .................... 403/164 |
| 5,042,676 A | * | 8/1991 | Gohlke ........................ 220/759 |
| 5,248,176 A | * | 9/1993 | Fredriksson ................. 294/1.1 |
| 6,142,718 A | * | 11/2000 | Kroll .......................... 410/106 |
| 6,547,474 B1 | * | 4/2003 | Smetz ........................ 403/78 |
| 6,905,098 B2 | * | 6/2005 | Tisol, Jr. ..................... 248/74.1 |
| 6,935,602 B2 | * | 8/2005 | Hardie ......................... 248/499 |

* cited by examiner

Primary Examiner—Flemming Saether
(74) Attorney, Agent, or Firm—Mark W. Croll; Paul F. Donovan

(57) ABSTRACT

A fastener assembly includes a collar configured to be secured to a structure, and a D-ring that may include a main ring body, end joints rotatably secured to the collar, and smooth intermediate sections integrally connecting the main ring body to the end joints. The smooth intermediate sections gradually transition the main ring body to the end joints. The main ring body may have a bow-tie cross-sectional shape that provides directional strength to the main ring body.

13 Claims, 5 Drawing Sheets

US 7,708,511 B2

FASTENING ASSEMBLY

FIELD OF THE INVENTION

Embodiments of the present invention generally relate to a fastening assembly, and more particularly to a fastening assembly that may be used to secure a cargo restraint within a vehicle.

BACKGROUND OF THE INVENTION

Many vehicles, such as sport utility vehicles, include a cargo restraint system located within in, or proximate, a trunk or tailgate area. A typical cargo restraint system includes a cargo net connected to at least one elastic cord that is fastened to a trim panel or sheet metal of the vehicle.

FIG. 1 illustrates a conventional fastening system for a cargo net within a vehicle 10. The fastening system includes a mushroom fastener 12 and a D-ring fastener 14. Typically, an eyelet (not shown) formed in an elastic cord (not shown) is wrapped around the mushroom fastener 12, which is bolted to a structure, such as a trim panel or sheet metal, of the vehicle 10.

FIG. 2 illustrates the D-ring fastener 14. The D-ring fastener 14 includes a D-ring 16 secured within an anchoring base 18. The anchoring base 18 is fastened to a structure 20 of the vehicle 10 by way of a conventional fastener, such as a bolt 22. An elastic cord (not shown) may then be looped through the D-ring 16. Optionally, a hook attached to the elastic cord may hook onto the D-ring 16.

FIG. 3 illustrates an exploded view of a D-ring fastener 24. The D-ring fastener 24 is similar to the D-ring fastener 14. The D-ring fastener 24 includes a D-ring 26, a collar 28, and a fastening member 30. The D-ring 26 rotatably secures to the collar 28 by way of end joints 32 rotatably securing within reciprocal openings (not shown) formed in the collar 28. Once the D-ring 26 is secured to the collar 28, the fastening member 30 is securely connected to the collar 28 through the central fastening opening 34. The D-ring fastener 24 may then be secured within the vehicle. As shown in FIG. 3, the D-ring 26, the collar 28, and the fastening member 30 are all separate components that are separately molded. Moreover, when installing the D-ring fastener 24 to a vehicle, the D-ring 26 is first attached to the collar 28. Installing the D-ring fasteners 14 and 24 within a vehicle may prove costly due to the time involved with handling multiple parts and securing the fasteners to the vehicle through separate fasteners (such as bolts).

FIG. 4 illustrates the end joints 32 of the D-ring 24. As shown in FIG. 4, abrupt transition areas 36 exist between the end joints 32 and the main ring body 38. Stress tends to concentrate in the abrupt transition areas 36. Because the main ring body 38 transitions to the end joints 32 at such abrupt diametric transitions, stress exerted by a load tends to be greatest at the transition areas 36. Consequently, the D-ring 24 is susceptible to fatigue and even breaking at the transition areas 36.

FIG. 5 illustrates a cross-sectional view of the main ring body 38. As shown in FIG. 5, the cross-section of the main ring body 38 is circular. The main ring body 38 is susceptible to sinking or deforming due to its circular cross-section. That is, after the D-ring 24 is molded, the main ring body 38 may have areas that shrink due to the temperature and pressure changes after the molding process.

Thus, a need exists for a fastener assembly that is easily manufactured and installed within a structure, such as a vehicle. Further, a need exists for a more robust, resilient fastener assembly that is less susceptible to deforming, and/or breaking.

SUMMARY OF THE INVENTION

Certain embodiments of the present invention provide a fastener assembly including a collar configured to be secured to a structure, and a D-ring rotatably secured to the collar. The D-ring may include a main ring body having grooves over a length of the main ring body, wherein the grooves provide the main ring body with a bow-tie cross-sectional shape that provides directional strength to the main ring body. The D-ring may also include end joints rotatably secured to the collar, and smooth intermediate sections integrally connecting the main ring body to the end joints. The smooth intermediate sections may gradually transition the main ring body to the end joints. External forces exerted on the D-ring are evenly distributed among the main ring body, the smooth intermediate sections, and the end joints.

The fastener assembly may also include a fastener secured within a fastener opening of the collar. The fastener may include an anchor configured to be secured within a reciprocal opening of a structure, and an actuatable pin within the anchor.

The collar and the D-ring may be molded as a single piece in a one-shot molding process. Alternatively, the collar and the D-ring may be molded as a single piece in a two-shot molding process using two different types of material.

Figure 1:
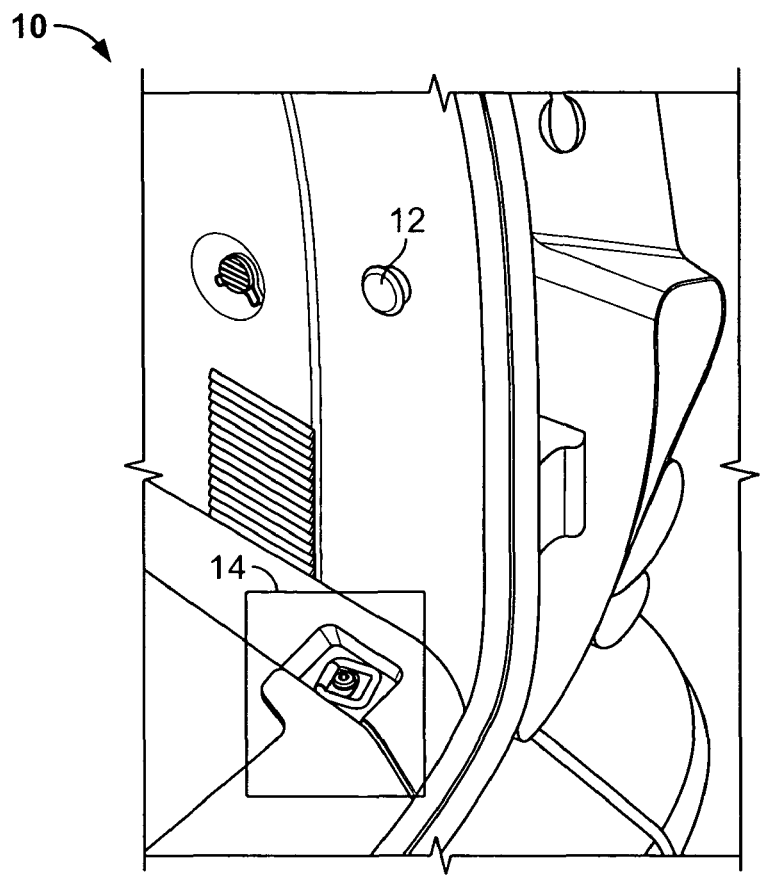
FIG. 1 illustrates a conventional fastening system for a cargo net within a vehicle.
Figure 2:
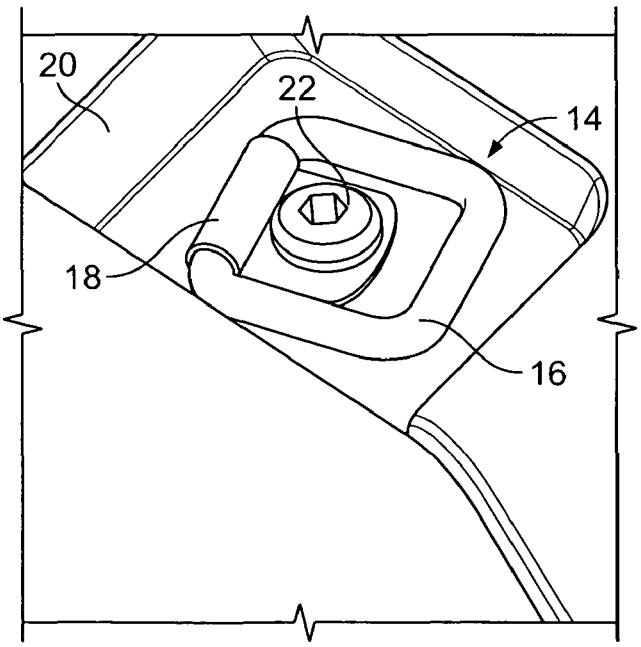
FIG. 2 illustrates a conventional D-ring fastener.
Figure 3:
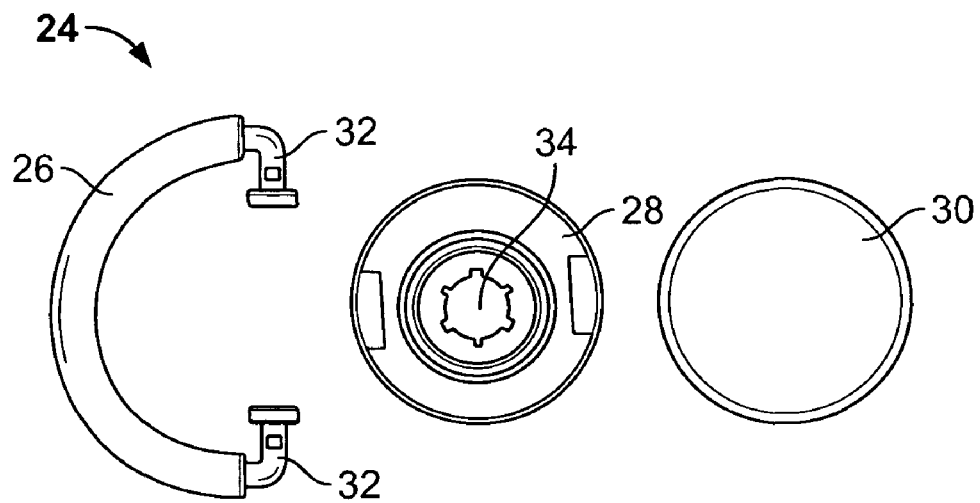
FIG. 3 illustrates an exploded view of a conventional D-ring fastener.
Figure 4:
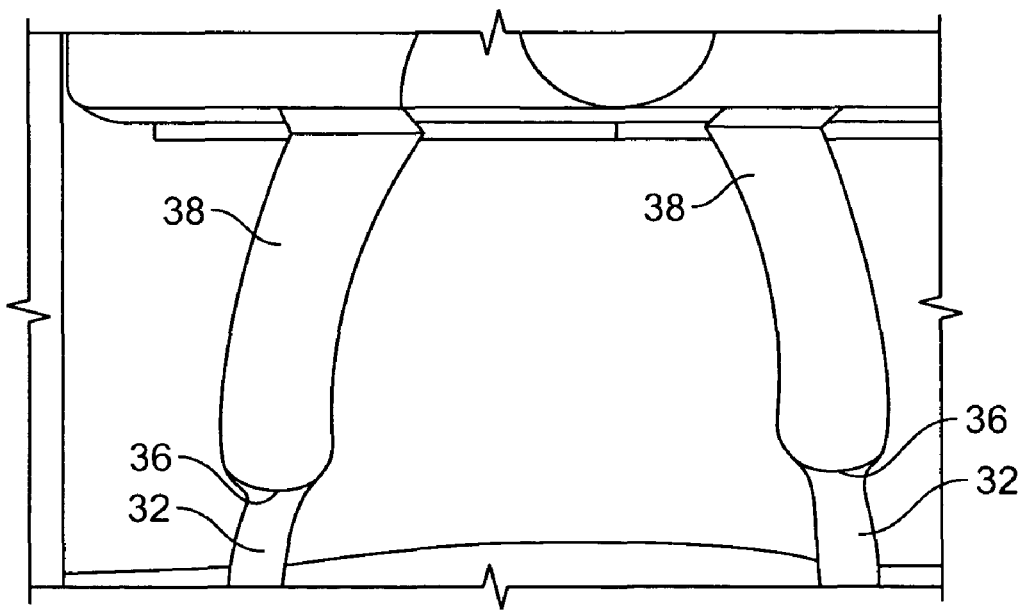
FIG. 4 illustrates an isometric view of end joints of a conventional D-ring.
Figure 5:
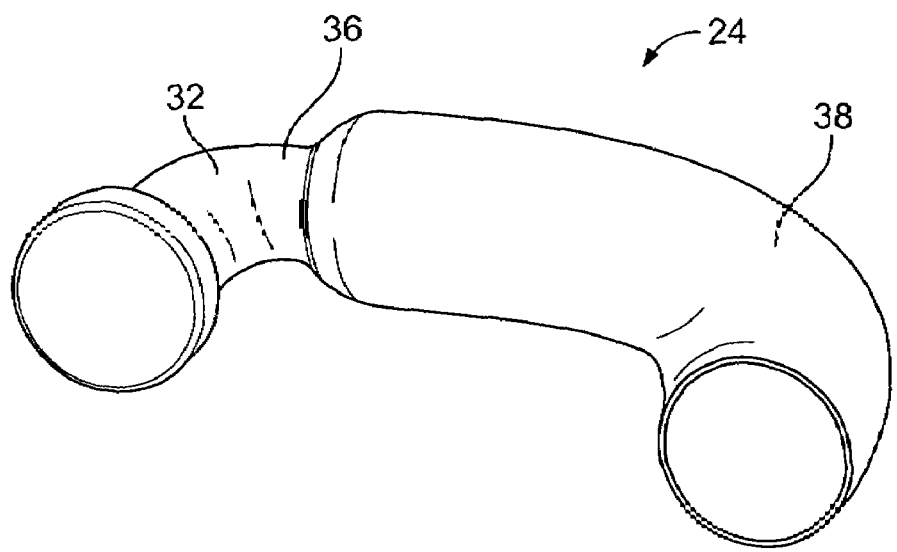
FIG. 5 illustrates a cross-sectional view of a conventional main ring body.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 6:
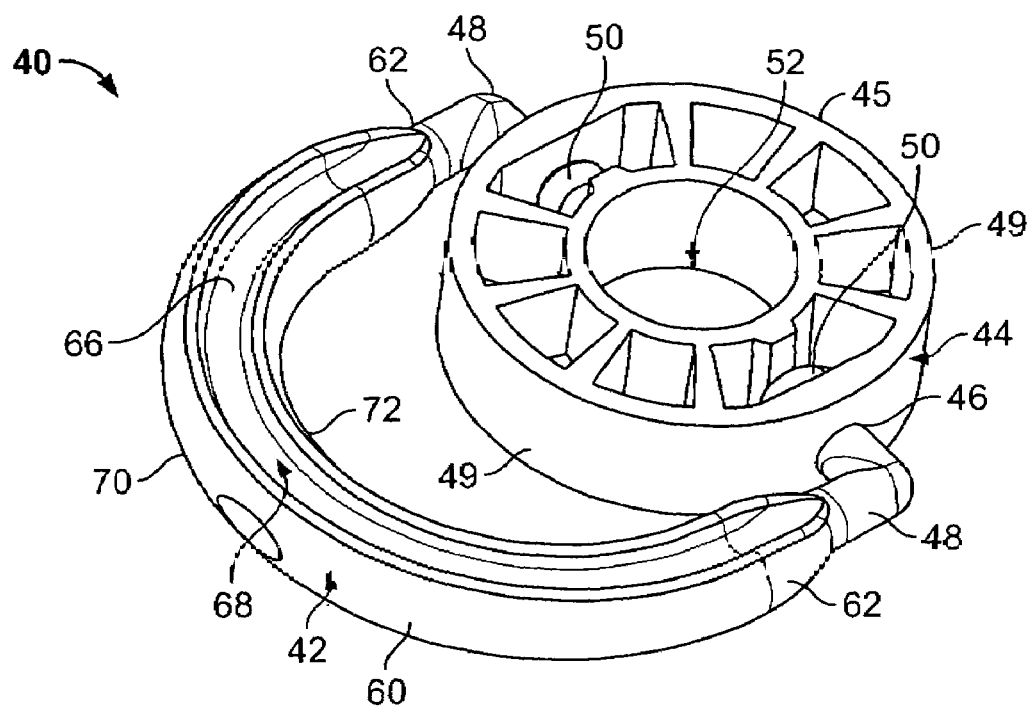
FIG. 6 illustrates an isometric bottom view of a D-ring assembly according to an embodiment of the present invention.
Figure 7:
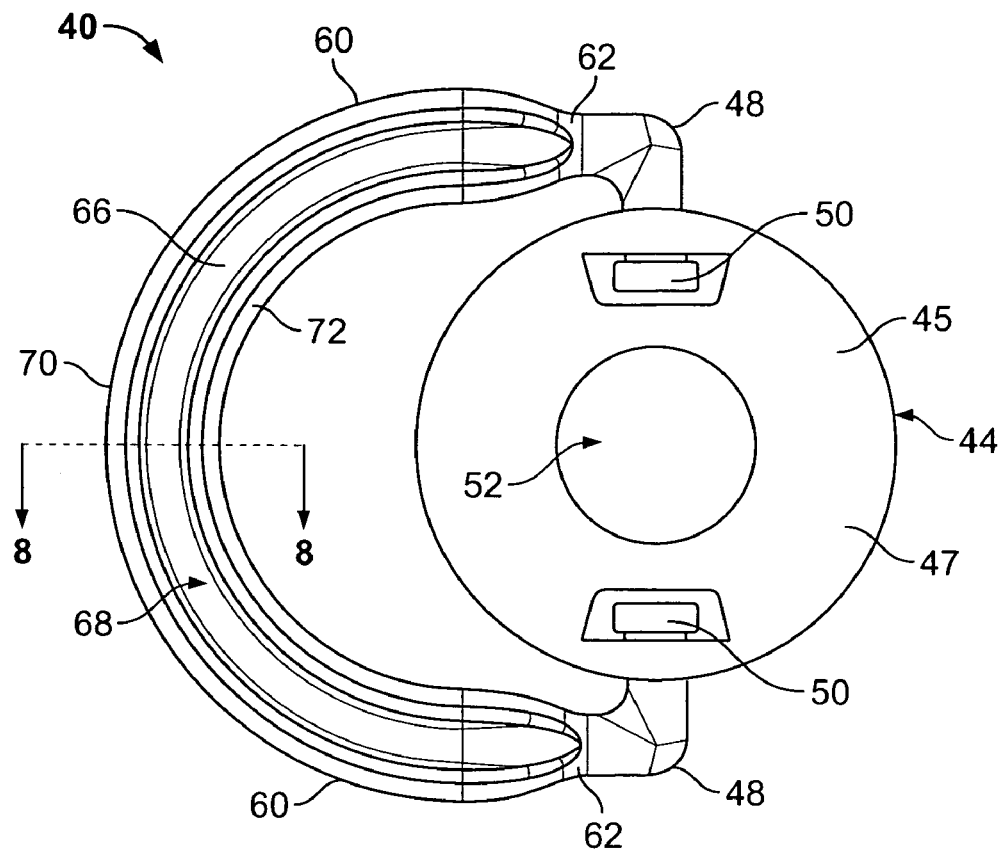
FIG. 7 illustrates a top view of a D-ring assembly according to an embodiment of the present invention.

FIG. 6 illustrates an isometric bottom view of a D-ring assembly 40 according to an embodiment of the present invention. FIG. 7 illustrates a top view of the D-ring assembly 40. Referring to FIGS. 6 and 7, the D-ring assembly 40 includes a D-ring 42 rotatably secured within a collar 44. The collar 44 includes a main circumferential body 45 having a top surface 47 integrally formed with a lateral circumferential wall 49. Openings 46 are formed through the lateral circumferential wall 49. The openings 46 rotatably retain end joints 48 of the D-ring 42. Knobs 50 at distal ends of the end joints 48 ensure that the end joints 48 do not slip through the openings 46. That is, the knobs 50 have a larger diameter than the openings 46. A fastener opening 52 is formed through the axial center of the collar 44.

The D-ring assembly 40 may be molded as a single, unitary piece. The D-ring assembly 40 may be injection molded using a single mold. Flash connections may connect the end joints 48 to the collar 44 during the molding process. That is, the mold may be configured so that only a small portion of the injected polymer exists between the end joints 48 and the collar 44 during the molding process. After the molded D-ring assembly 40 cools and dries, the flash connection may be broken. For example, rotating the D-ring 42 with respect to the collar 44 may be sufficient to break the flash connections that exist between the D-ring 42 and the collar 44.

The D-ring assembly 40 may be molded in a one-shot molding process, in which the D-ring 42 and the collar 44 are molded from the same material, such as a first polymer. Alternatively, the D-ring assembly 40 may be molded in a two-shot molding process, in which the D-ring 42 is injection molded from a first polymer, while the collar 44 is molded from a second polymer, in which the second polymer is stronger than the first polymer. For example, if the collar 44 is to be stronger than the D-ring 42, the collar 44 is formed of the stronger material, while the D-ring is formed of the other material, which is most likely less expensive than the stronger material. Thus, production costs may be reduced through the two-shot molding process.

Because the D-ring assembly 40 may be molded as a single piece, only one mold or die is used to form the D-ring assembly 40. Further, once the D-ring assembly 40 is formed, the D-ring 42 is already connected to the collar 44. Thus, there are minimal components to account for during an installation process.

As shown in FIGS. 6 and 7, the D-ring 42 includes a main ring body 60 that integrally connects to the end joints 48 through smooth intermediate transition areas 62. The smooth transition areas 62 gradually neck down to the end joints 48. That is, the diameter of the smooth intermediate transition areas 62 gradually reduce from the main ring body 60 to the end joints 48. Thus, force is more evenly distributed over the transition areas 62, the end joints 48, and the main ring body 60, as compared to prior D-ring fasteners. The transition areas 62 act to spread exerted force more evenly between the transition areas 62, the end joints 48, and the main ring body 60. Thus, fatigue, cracking, or breaking at the transition areas 62 is minimized.

Optionally, the size of the D-ring 42 may be uniform throughout, including the end joints 48. For example, the size of the main ring body 60, and the end joints 48 may be the same, without any reduced or necked down transition areas.

The main ring body 60 may also include grooves 66 formed through a central axial area. There is less material within the central area 68 as compared to the lateral areas 70 and 72.

Figure 8:
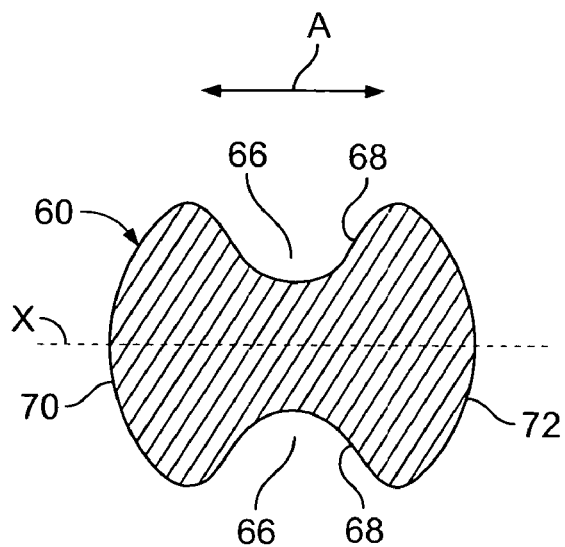
FIG. 8 illustrates a cross-sectional view of a main ring body through line 8-8 of FIG. 7.

FIG. 8 illustrates a cross-sectional view of the main ring body 60 through line 8-8 of FIG. 7. As shown in FIG. 8, the cross-section of the main ring body 60 is bow-tie in shape. The lateral areas 70 and 72 are thicker than the central area 68 of the main ring body 60. The bow-tie shape of the main ring body 60 provides directional strength in the direction of arrows A. Force exerted by an elastic cord, or hook, is exerted on the main ring body 60 in the directions of arrow A. Thus, the main ring body 60 is configured to handle these forces through the bow-tie shape, in which the main ring body 60 is solid through its horizontal axis x.

The bow-tie shape of the main ring body 60 provides the same strength in the directions of arrow A as a similarly sized circular cross-section, but with less material than a circular cross sectional ring. Thus, less material is used to form the main ring body 60. Further, because the main ring body 60 is more compact than a circular cross-sectional ring, the main ring body 60 is less susceptible to sinking (i.e., material depression) or other such deformation. The grooves 66 in the top and bottom of the main ring body 60 improve the flow of material during the molding process to reduce trapped gas, and improve cooling efficiency to prevent unsightly sink marks.

Figure 9:
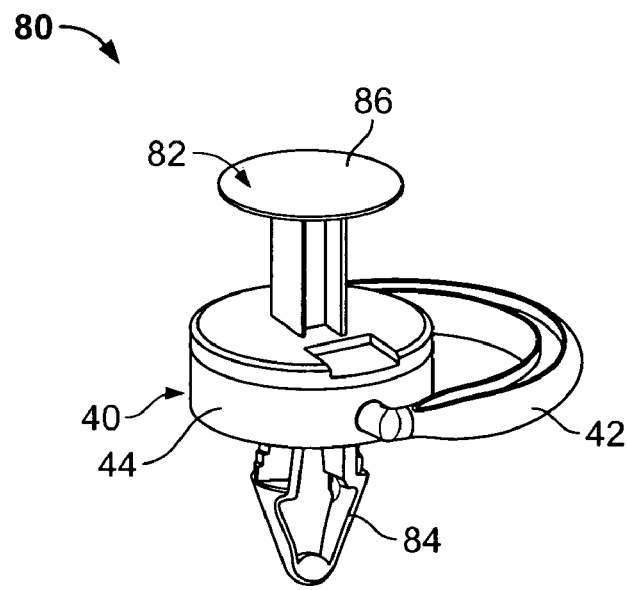
FIG. 9 illustrates an isometric view of a fastener assembly according to an embodiment of the present invention.

FIG. 9 illustrates an isometric view of a fastener assembly 80 according to an embodiment of the present invention. The fastener assembly 80 includes the D-ring assembly 40, including the D-ring 42 and the collar 44, and a fastener 82. The fastener 82 may include an anchor 84 and an actuatable pin 86. The fastener 82 is configured to secure to a reciprocal opening in a structure (such as a vehicle trim panel). For example, the anchor 84 is positioned in the opening, and the pin 86 is actuated into the anchor 84 to spread the anchor 84 into securing engagement with the opening. The fastener 82 may be an ErgoLok Tuflok™, as manufactured by Illinois Tool Works.

The anchor 84 is configured to secure into the collar 44 through the fastener opening 52 (as shown in FIGS. 6 and 7). The collar 44 is adapted to retain a wide variety of such fasteners 82. That is, a plurality of fasteners of different shapes and sizes may all include the same sized central collar engaging area. Thus, each fastener may be configured to secure to the collar 44. Thus, one collar 44 may be used with a wide variety of fasteners.

A wide variety of fastener assemblies 80 may be manufactured through one D-ring mold, and a plurality of fasteners. The same type of D-ring assembly 40 may be used with a wide variety of fasteners to produce a wide variety of fastener assemblies.

The fastener assembly 80 may be shipped as shown in FIG. 9. The D-ring 42 and the collar 44 are molded together as a single piece, and the fastener 82 is then secured to the collar 44. In order to install the fastener assembly 80 to a structure, one merely attaches the fastener assembly 80 to the structure and presses the pin 86 down toward the structure, instead of securing a separate collar to a separate D-ring, and then using a separate fastener to secure the assembly to the structure.

Figure 10:
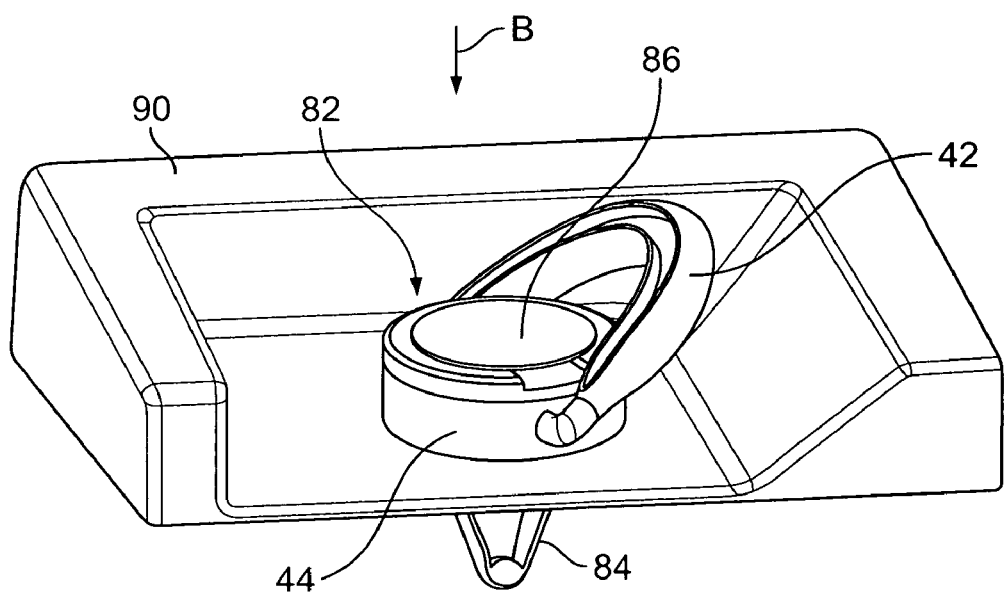
FIG. 10 illustrates an isometric view of a fastener assembly secured to a structure according to an embodiment of the present invention.

FIG. 10 illustrates an isometric view of the fastener assembly 80 secured to a structure 90. The fastener assembly 80 is secured to the structure 90 through the fastener 82. Once the anchor 84 is positioned within a reciprocal opening (not shown) of the structure, the pin 86 is pushed downwardly in the direction of arrow B. The pin 86 spreads the anchor 84 into a secure position. The structure 90 may be a trim panel of a vehicle, such as within a tailgate area. The fastener assembly

80 may then securely engage elastic cords, hooks, or the like, of a cargo net, or other such item.

Thus, embodiments of the present invention provide a fastener assembly that is easily manufactured and installed within a structure, such as a trim plate of a vehicle. Additionally, embodiments of the present invention provide a robust, resilient fastener assembly that is less susceptible to deforming, and/or breaking. The cored-out grooves of the main ring body provide directional strength to the D-ring, and the smooth transition areas disperse force evenly over the D-ring.

While various spatial terms, such as upper, lower, mid, lateral, horizontal, vertical, and the like may used to describe portions of the D-ring assembly and/or the fastener assembly, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener assembly comprising:
a collar configured to be secured to a structure; and
a D-ring comprising: (i) a main ring body including a bow-tie, cross-sectional shape; (ii) end joints rotatably secured to said collar; and (iii) smooth intermediate sections also including a bow-tie, cross-sectional shape integrally connecting said main ring body to said end joints, wherein said end joints include first and second legs generally formed together in "L" shapes, said first legs connected to said smooth intermediate sections and said second legs secured to said collar, said smooth intermediate sections gradually necking down from said main ring body to said first legs of said end joints;
wherein said collar and said D-ring are integrally molded together using a single mold; and
wherein force is evenly distributed among said main ring body, said smooth intermediate sections, and said end joints.

2. The fastener assembly of claim 1, wherein said collar and said D-ring are molded in a one-shot molding process.

3. The fastener assembly of claim 1, wherein said collar and said D-ring are molded in a two-shot molding process using two different types of material.

4. The fastener assembly of claim 1, wherein said main ring body comprises at least one groove formed over said main ring body.

5. The fastener assembly of claim 1, wherein said collar comprises a fastener retaining opening, wherein said fastener retaining opening is configured to receive and retain a plurality of fasteners.

6. A fastener assembly comprising:
a collar configured to be secured to a structure; and
a D-ring comprising a main ring body, end joints rotatably secured to said collar, and smooth intermediate sections integrally connecting said main ring body to said end joints, said smooth intermediate sections gradually necking down from said main ring body to said end joints, and said main ring body and said smooth intermediate sections having bow-tie cross-sectional shapes, wherein said bow-tie cross-sectional shapes are formed by said main ring body and said smooth intermediate sections having grooves formed over a length of said main ring body and a length of said smooth intermediate sections.

7. The fastener assembly of claim 6, wherein said collar and said D-ring are integrally molded together using a single mold.

8. The fastener assembly of claim 7, wherein said collar and said D-ring are molded in a one-shot molding process.

9. The fastener assembly of claim 7, wherein said collar and said D-ring are molded in a two-shot molding process using two different types of material.

10. The fastener assembly of claim 6, wherein said collar comprises a fastener retaining opening, wherein said fastener retaining opening is configured to receive and retain a plurality of fasteners.

11. A fastener assembly comprising:
a collar configured to be secured to a structure, said collar having a fastener opening;
a D-ring comprising: (i) a main ring body comprising grooves over a length of said main ring body, wherein said grooves provide said main ring body with a bow-tie cross-sectional shape that provides directional strength to said main ring body; (ii) end joints rotatably secured to said collar; and (iii) smooth intermediate sections comprising groves over portions thereof so as to form bow-tie cross-sectional shapes, said smooth intermediate sections integrally connecting said main ring body to said end joints, wherein said end joints include first and second legs generally formed together in "L" shapes, said first legs connected to said smooth intermediate sections and said second legs secured to said collar, said smooth intermediate sections gradually necking down from said main ring body to said first legs of said end joints, and wherein force is evenly distributed among said main ring body, said smooth intermediate sections, and said end joints; and
a fastener secured within said fastener opening, said fastener comprising an anchor configured to be secured within a reciprocal opening of a structure, and an actuatable pin within said anchor.

12. The fastener assembly of claim 11, wherein said collar and said D-ring are molded as a single piece in a one-shot molding process.

13. The fastener assembly of claim 11, wherein said collar and said D-ring are molded as a single piece in a two-shot molding process using two different types of material.

* * * * *